United States Patent [19]
Tonkowich et al.

[11] 3,756,341

[45] Sept. 4, 1973

[54] VEHICLE ANTI-THEFT SYSTEM

[75] Inventors: William Tonkowich, Franklin Lakes; John A. Medvitz, Garfield, both of N.J.

[73] Assignee: Safetech, Inc., Fairfield, N.J.

[22] Filed: July 22, 1971

[21] Appl. No.: 165,265

[52] U.S. Cl............ 180/114, 70/163, 70/243, 70/257, 70/278, 123/198 B, 307/10 AT, 174/115
[51] Int. Cl............................................. B60r 25/04
[58] Field of Search.................... 180/114, 82; 307/10 AT; 340/63, 64; 317/134; 70/242, 243, 257, 278, 280, 281, 282, 163; 123/198 B; 200/43, 44, 45, 61.64

[56] References Cited
UNITED STATES PATENTS

| | | | |
|---|---|---|---|
| 3,670,836 | 6/1972 | Tonkowich et al. | 180/114 |
| 3,669,211 | 6/1972 | Gilgoff | 180/114 |
| 1,549,325 | 8/1925 | Murray | 200/19 L |
| 3,619,633 | 11/1971 | Brandon | 180/114 X |
| 2,819,770 | 1/1958 | Gibbs | 180/114 |
| 2,964,733 | 12/1960 | Raju | 340/63 |
| 2,861,644 | 11/1958 | Martin | 180/114 |
| 3,063,282 | 11/1962 | Aytes | 70/163 |
| 3,354,980 | 11/1967 | Nielsen | 180/114 |
| 2,882,987 | 4/1959 | McDougal, Sr. et al. | 180/114 |

*Primary Examiner*—Kenneth H. Betts
*Assistant Examiner*—John P. Silverstrim
*Attorney*—Norman N. Holland

[57] ABSTRACT

The invention is a control device which prevents the operation of a motor vehicle by unauthorized persons. The system includes a fuel control valve which directly connects the fuel line to the carburetor or fuel injector. This valve is an electrically operated tamper-proof valve which remains closed except when it receives an electric control signal from a tamper-proof electric control box. The valve opening signal is fed from the control box when a particular code such as a 4, 5, 6 or 7 digit code is entered into the box by depressing several selected control buttons of a number of available control buttons. The control box itself has a tamper-proof metal outer casing which prevents unauthorized access to the electrical system but which includes a separate code operated electrical device for permitting the control box to be opened for maintenance or repair by authorized personnel.

7 Claims, 6 Drawing Figures

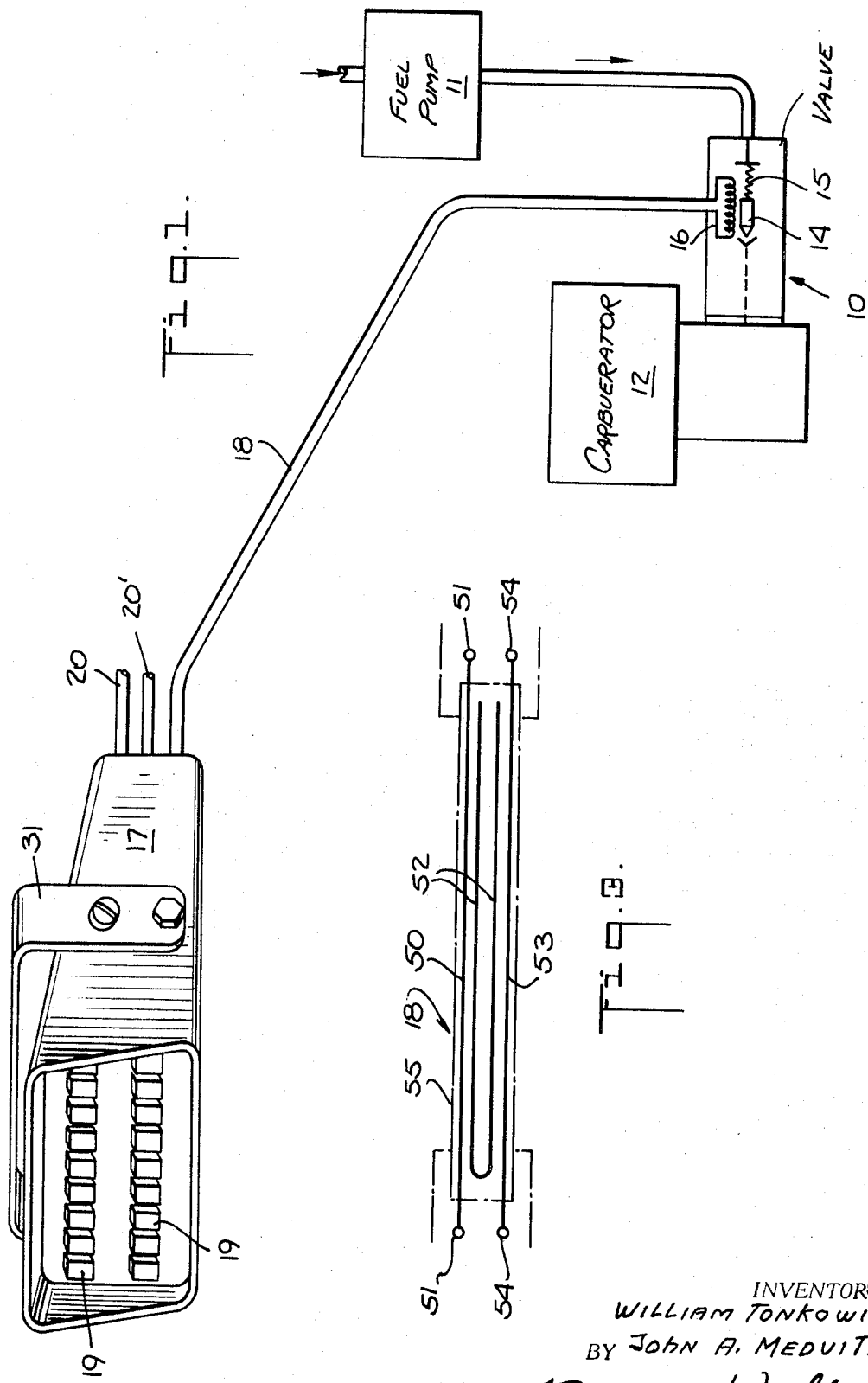

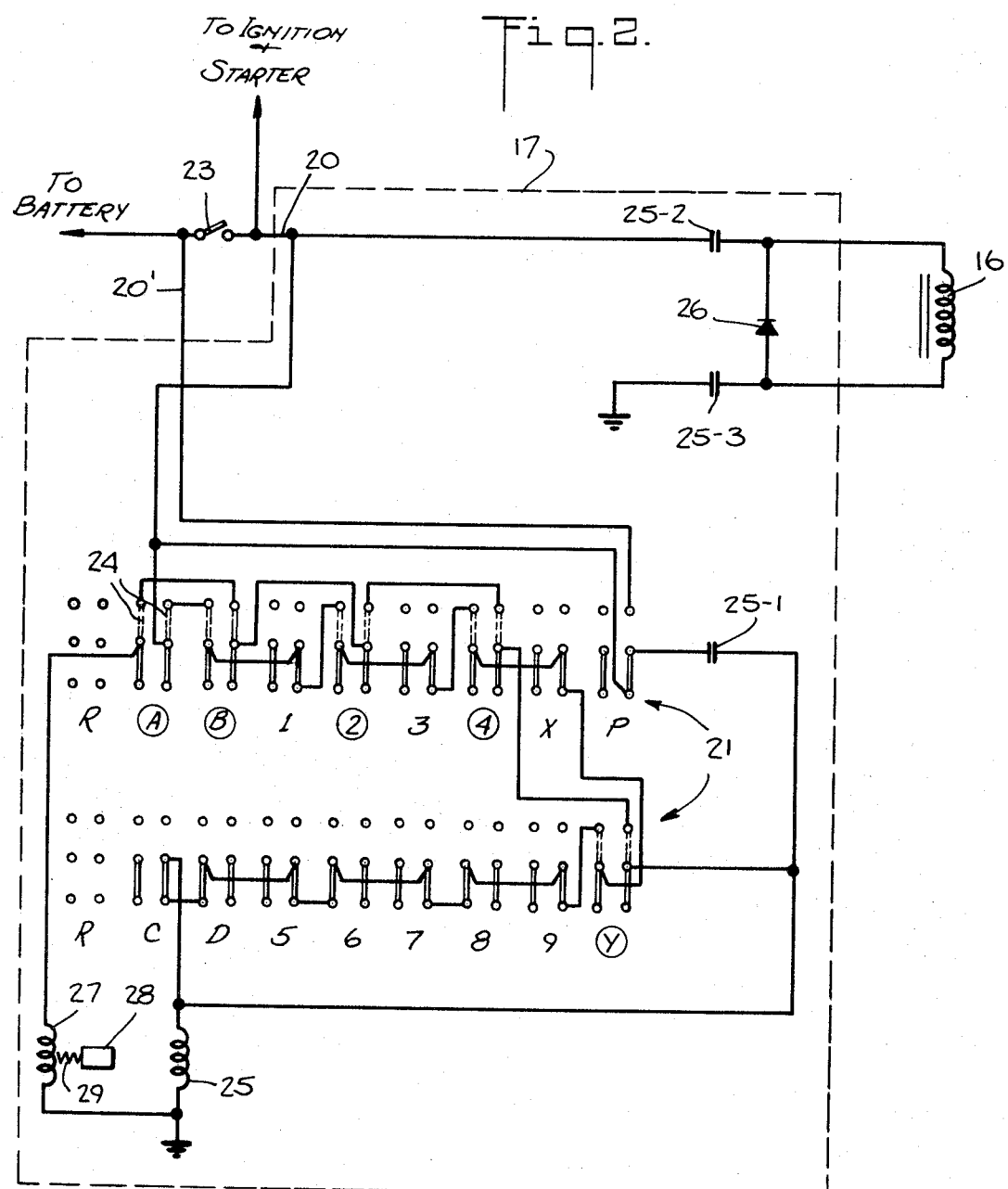

INVENTORS
WILLIAM TONKOWICH
BY JOHN A. MEDUITZ

ATTORNEY

VEHICLE ANTI-THEFT SYSTEM

BACKGROUND OF THE INVENTION

The present invention relates to theft protection for vehicles such as automobiles or boats or other fluid fuel powered vehicles. More particularly, the invention relates to an anti-theft system which is inserted at the carburetor or fuel injector input in the vehicle fuel line and which is more reliable and significantly simplified as contrasted with prior systems as well as being tamper-proof.

The increasing rate of vehicle thefts including thefts by organized and sophisticated operators has made the use of improved vehicle protection devices desirable in most areas and almost essential in others. While a variety of protective systems have now been developed, most of these prior systems fail to foil sophisticated vehicle thieves and these and others of the systems have also proven to be both unduly complex and subject to malfunction due to their complexity.

The new system, in accordance with the present invention, includes a relatively simple and effective electrical coding system composed almost exclusively of reliable switch elements which are mounted in a novel and tamper-proof protective casing. This coding system as used with an improved tamper-proof fuel valve provides an anti-theft system which limits vehicle use to persons having possession of the operating code.

Accordingly, an object of the present invention is to provide a vehicle anti-theft system which is fully tamper-proof as well as being completely reliable and relatively inexpensive.

Another object of the present invention is to provide an electrically operated vehicle protection system wherein the electrical system itself is both tamper-proof as well as being composed of reliable electrical elements having an almost indefinitely long operating life.

Another object of the present invention is to provide a vehicle anti-theft device which is easily inserted into a conventional vehicle fuel supply system.

Another object of the present invention is to provide an improved vehicle anti-theft system which cannot be successfully operated by unauthorized persons but which may be readily inspected and repaired.

Another object of the present invention is to provide an improved tamper-proof control box for an electrically actuated protection system.

Another object of the present invention is to provide an improved tamper-proof electrical cable for electrically operated security systems.

Other and further objects of the invention will be obvious upon an understanding of the illustrative embodiment about to be described, or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawing, forming a part of the specification, wherein:

FIG. 1 is a diagrammatic illustration of a typical vehicle system incorporating the anti-theft device in accordance with the present invention.

FIG. 2 is a schematic electrical diagram illustrating a preferred code circuit for providing the electrical valve operating signal.

FIG. 3 is a diagrammatic illustration of the preferred tamper-proof electrical cable.

DESCRIPTION OF THE PREFERRED EMBOIDMENT

Figure 4:
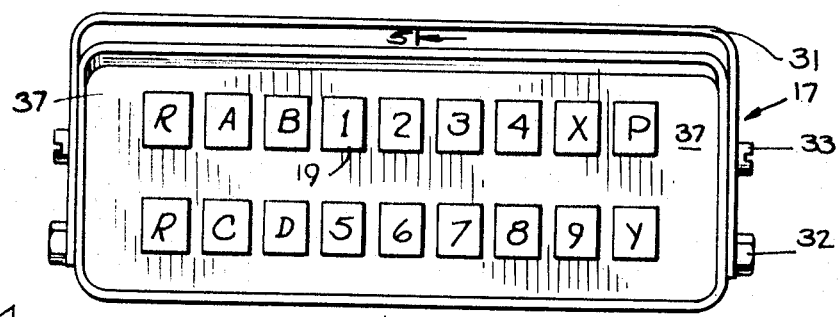
FIG. 4 is a front elevational view of the control box.
Figure 5:
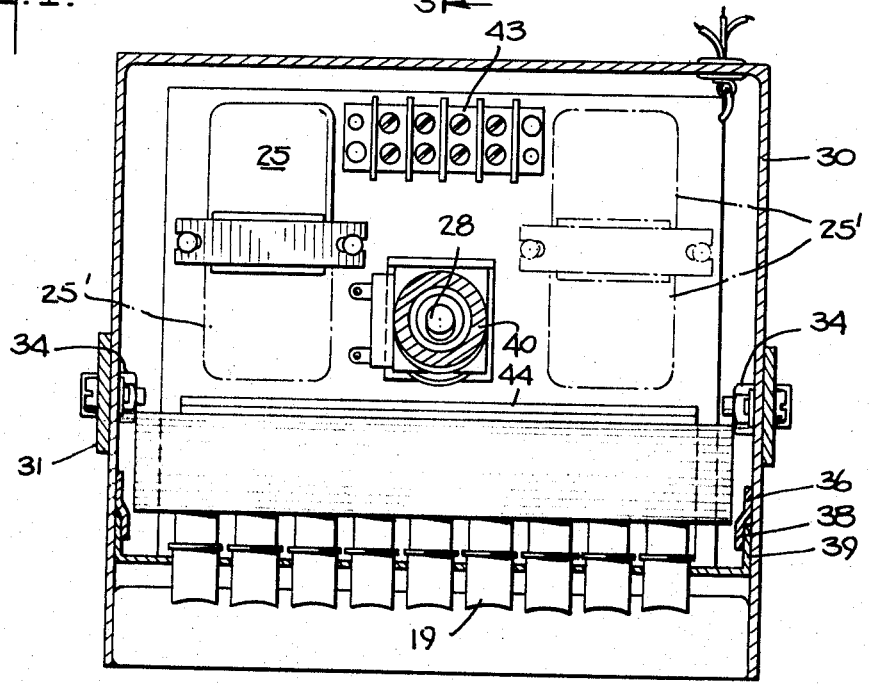
FIG. 5 is a vertical sectional view of the control box taken along line 5—5 on FIG. 4.
Figure 6:
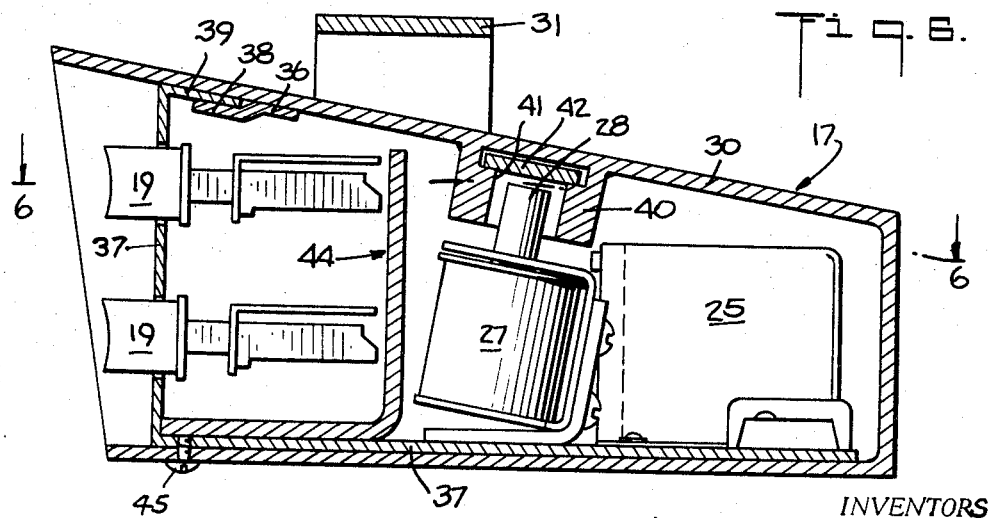
FIG. 6 is a horizontal sectional view taken along line 6—6 on FIG. 5.

FIG. 1 illustrates a preferred embodiment of the anti-theft device incorporated in the fuel system of an internal combustion engine such as a typical automobile engine. A control valve 10 is seen to be inserted in the fuel line between a fuel pump 11 and the engine carburetor 12. The valve 10 in its unenergized or "off" position remains closed preventing fuel from being fed into the carburetor 12. An attempt to operate the vehicle with the valve 10 remaining closed will permit the engine to operate only a matter of seconds until the carburetor 12 is drained. At the most, this will only permit the vehicle engine to be started and driven possibly a few hundred feet before the engine will stall. The valve 10 in its preferred embodiment is an electrically operated valve whose plunger 14 is moved to its open position against the force of a spring 15 by an electric current in solenoid 16 which energizes from the control box 17 through a tamper-proof electric cable 18. The control box 17 has vehicle battery power fed into it and it includes an encoding circuit operated by push buttons 19 to provide the necessary electrical output into the cable 18. The control box 17 is seen to include a relatively large number of buttons. In order to produce an output signal, a four, five, six or seven digit code is chosen which requires four, five, six or seven buttons to be selected and depressed from the total number of buttons 19. In the preferred system, as will be more fully described below, the depression of any button 19 other than one of the proper buttons 19 makes the control box 17 inoperative and prevents the operator from obtaining an output signal so that the valve 10 remains closed.

The control valve 10 may be one of a number of tamper-proof valves having an electrically controlled valve stem. The electrical wiring into the valve 10 as well as the structural elements of the valve are surrounded by a hardened metal casing which is locked to the carburetor 12 so that a thief is unable to remove or disassemble the valve 10. A preferred valve for this use is shown in United States patent application entitled "Tamper-Proof Valve" of Allan U. Stone et al., Ser. No. 165,264, filed July 22, 1971. Another valve which is suitable for this use is illustrated in United States patent application entitled "Anti-Theft Device for Motor Vehicles" of William Tonkowich et al., Ser. No. 59,871, filed July 31, 1970 now U.S. Pat. No. 3,670,836 dated June 20, 1972.

As seen in FIG. 1, the vehicle battery power is fed into the control box 17 through an input cable 20. The coding system of FIG. 2 operated by a selected number of the push buttons 19 couples this battery power to the valve 10 through the tamper-proof cable 18. The connecting cable 18 and the control box 17 are tamper-proof so that a thief cannot obtain access to and bypass or otherwise energize the valve 10 operating wires.

THE ELECTRIC CODE CIRCUIT

The coding circuit 21 which is used by the vehicle operator and which is illustrated in FIG. 2 will first be described and then the preferred arrangement of the control box 17 and the connecting cable 18 will then be described.

The coding circuit 21 is mounted within the control box 17 whose front panel 37 has two rows of buttons 19 which have symbols on their surface. Typical symbols for the two rows of buttons 19 may be as follows:

R A B 1 2 3 4 X P

R C D 5 6 7 8 9 Y

In order to start the engine, the regular ignition key must be inserted and turned to its ON position to close ignition switch 23 to energize the ignition system as well as to provide power for box 17 through line 20. Then a preset code of a number of digits is used as buttons 19 operate double pole double throw switches 24. The switches remain depressed and are known as push-/on-push/release switches. These switches 24 are commercially available.

The code may include any combination of one to seven digits, however, as a practical matter only four to seven are used since one to three digits provide too few combinations for satisfactory security. A thief cannot know, in any given car, whether the code is four, five, six or seven digits so that the number of combinations available is approximately 14,000. When the proper code is used, the switches 24 representing this code stay depressed and the electric solenoid valve 10 is energized and in its open position allowing fuel to flow. In order to erase the code after the valve is opened, the two switches 24 marked R are pushed which then release the switches which had been depressed for the code. The vehicle may now be started in the normal manner as fuel will flow through the solenoid valve 10 into the carburetor 12.

The circuit diagram FIG. 2 will now be described in more detail.

To turn the system on, the ignition switch 23 is first closed thereby making electric power available to the switches 24. For illustrative purposes, this circuit diagram was prepared for the code AB24Y. If now switches 24 designated A, B, 2, 4 and Y are pushed with their contacts beings in the broken line positions, it is seen that the current flow forms a continuous path from ignition switch 23 to relay coil 25 and one contact 25-1 of relay 25 latches the relay. Another contact 25-2 of relay 25 feeds power to the ungrounded side of the solenoid 16 of valve 10 and a third contact 25-3 of relay 25 closes the solenoid valve circuit to ground.

The system is now turned on and the vehicle can be started since fuel will flow to the carburetor 12 through the now opened solenoid valve 10. The two switches 24 labeled R are now pushed which releases the code switches A, B, 2, 4 and Y to erase the code.

To permit the car to be operated without using the code system, the switch 24 labeled P is provided. While the vehicle is running the switch P is pushed. It can now be seen that relay 25 will remain latched through power line 20' even after ignition switch 23 is turned off so that the car can be stopped and started without the need of re-entering the code. It can also be seen that if the P switch is not pushed on when the ignition switch is turned off to stop the engine, the coil of relay 25 is de-energized and the system is turned off and will not again turn on until the code is again entered into the push button switches 24.

It can also be seen that if any button 19 for a switch 24 is pushed which is not in the code, the circuit path is broken and the system cannot turn on. A diode 26 connected across the valve solenoid 16 protects the contacts 25-2 and 25-3.

A box locking solenoid 27 which operates a plunger 28 against the force of a spring 29 is coupled to the battery power through the circuit illustrated in FIG. 2 using the second contacts on the closed switches 24 labeled A, B, 2, 4 and Y, when the operating code is set in using code buttons 19. The locking solenoid 27 permits the control box 17 to be opened only when it is energized by the insertion of the operating code as will be described below in the detailed description of the control box 17.

THE TAMPER-PROOF CONTROL BOX

The tamper-proof control box 17 will now be described in detail. It has a tamper-proof design which prevents any intrusion by a would-be thief while permitting the owner to open the box so that service and repair may be performed. The box 17 has an outer housing 30 which is preferably of one piece construction and of relatively thick hardened steel. A mounting bracket 31 bolts to the housing 30 with two bolts 32 and 33 on each side, with the lower bolt 32 on each side being of hardened steel. Bolts 32 are tightened into place with elastic stop nuts 34 which cannot be removed from the outside. The bracket 31 is preferably attached to the vehicle with hardened sheet metal screws. The two upper bracket bolts 33 engage the housing 30 to permit an adjustment of the angle of the control box 17 to suit the operator.

The housing 30 has three metal stops 36 positioned inside and close to the housing front to engage the front panel 37. These three stops 36 have a lip 38 so that a tool such as a chisel cannot be forced into the small space between the front panel 37 and the housing 30 to bend the flanges 39 of front panel 37 to gain entry to the box.

The housing 30 has a fitting 40 on the underside of its top which has a hole 41 bored into it for accepting the plunger 28 of box locking solenoid 27, already described previously, which locks the front panel 37 in place when the unit is de-energized. When the system is energized by inserting the correct code, the solenoid plunger 28 is drawn down and the front panel 37 can be removed. Drilling through the top of housing 30 to manually push solenoid plunger 28 down is further prevented by a hardened tool steel disc 42 fitted into fitting 40. The disc 42 prevents penetration by drilling since it is hardened and since it will rotate if the drill bit begins cutting into it.

To insert the front panel 37 into the housing 30, the three cables 18, 20 and 20' are connected as indicated in the circuit diagram of FIG. 2. The proper code is then inserted to energize the solenoid 27 to pull solenoid plunger 28 down thereby allowing the insertion of the front panel 37 into the housing 30. Screws 45 then are inserted to hold the front panel 37 tightly against the housing 30 to prevent rattling due to vibration. Whenever the push buttons 19 are released to their undepressed positions, the locking bolt 28 returns to its normal up position to lock the front panel 37 to the fitting 40. The front panel 37 can then be removed only after the operating code is again inserted and only then before the two R buttons 19 are pushed in to erase the code. It can thus be seen that the power to the locking solenoid 27 is turned off as soon as the code is erased by the depression of the two R buttons. This prevents tampering with the interior of the housing 30 even when the engine is running or when the parking button 19 P is in the on position.

The front panel 37 mounts the solenoid 27, relay 25, and a terminal board 43. Tampering with relay 25 by drilling through the housing 30 is made impractical by mounting relay 25 in different positions shown as 25,' on panel 37 thereby making its exact location impossible to predict by the would-be thief. Drilling through housing 30 is difficult without first removing the housing 30 from its mounted position in the vehicle which, as previously indicated, is difficult since hardened bolts 32 with inner elastic stop nuts 34 are difficult to release.

The positions of the wires on terminal board 43 may also be varied so that a would-be thief cannot know the exact location of the power lead to the solenoid valve 10. Cable 18 is knotted or otherwise firmly fastened within the box 17 to prevent its end from being drawn clear of the box 17. A metal shield 44 firmly attached to the front plate 37 minimizes any chance of a successful front attack through the switches 19 by a would-be thief.

THE TAMPER-PROOF CABLE

A preferred embodiment of the cable 18 is shown in FIG. 3. Several hundred strands of small diameter insulated magnet wire is preferably used for the construction of the cable 18. As can be seen in FIG. 3, a small number of separate strands sufficient to carry the current are intermingled with the dummy strands 52 to form one conductor 50 for solenoid valve 10. These strands have their ends soldered together at opposite ends 51 of the conductor 50. A bunch of several hundred identical strands 52 are formed in a U configuration to surround and conceal conductor 50. A third bunch of several strands with soldered ends 54 forms a conductor 53 similar to conductor 50. The three bunches 50, 52 and 53 which are all of identical wire strands are then placed together and intermingled and covered with an encapsulating coating. They are then fitted through a plastic tubing 55 which is shrunk under heat to tightly encase the strands as a cable 18. Cable 18 thus delivers power to the solenoid valve 10 through a few intermingled and insulated strands 50 for one side of the solenoid valve coil 16 and a few intermingled and insulated strands 53 for the other side of the solenoid valve coil 16. If the cable 18 is cut by the would-be thief, he first encounters the encapsulating coating which binds the many fine strands 50, 52 and 53 into a tight bundle and then even if he is able to fan out the strands, he will have great difficulty finding a sufficient number of strands to carry the current to energize the solenoid valve 10. In picking wires at random, he will most likely eventually encounter two of the U connected strands resulting in short circuiting his probing power supply and possibly burning the cable to destruction. It is therefore clear that the cable 18 is virtually tamper-proof particularly as regards a thief who has only a limited time to seek to by-pass the protective device of this invention.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:

1. An anti-theft system for fluid fueled apparatus comprising the combination of:
    an electrically operated fluid control valve adapted for insertion into a fuel feed line for cutting off fuel flow to the apparatus;
    a source of electric power including a power output interrupting means;
    electrical means coupling said fluid control valve to the output of said source of electric power;
    said means for interrupting the electric power supply output to said valve including a code actuated switching means;
    a control box for said switching means including a removable panel;
    an electric lock for releasably coupling said panel to said control box;
    said lock having a movable plunger releasably connecting said panel to the remaining portions of said box and having a plunger operating solenoid for moving said plunger and releasing said panel;
    said solenoid being electrically coupled to said power supply output for operation thereby; and
    a hardened metal shield member positioned between said plunger and the adjacent wall portions of said control box for limiting access to the plunger through the wall of said control box.

2. The anti-theft system as claimed in claim 1 in which said panel has angularly positioned flanges at exposed edges, and cooperating lip means positioned on interior portions of said control box for receiving said flanges.

3. The anti-theft system as claimed in claim 1 in which said means coupling said valve to said source of electric power comprises a multi-strand cable, a plurality of said strands being intermingled with the remaining strands and having their adjacent ends electrically connected to one another, and all of said strands being encapsulated with a coating compound.

4. The means as claimed in claim 3 which further comprises a heat shrunk surrounding all of said strands.

5. The anti-theft system as claimed in claim 1 in which said means coupling said valve to said source of electric power comprises a multi-strand cable, a plurality of said strands comprising a fractional portion only being intermingled with the remaining strands and having their adjacent ends electrically connected to one another to form a first conductor, and a plurality of additional strands comprising a fractional portion only and being intermingled with all other strands having their adjacent ends connected to one another to form a second conductor.

6. The means as claimed in claim 5 in which further comprises a heat shrunk sheath surrounding all of said strands.

7. The means as claimed in claim 5 which further comprises a coating compound encapsulating all of said strands.

* * * * *